US011481577B2

(12) United States Patent
Juillard (10) Patent No.: US 11,481,577 B2
(45) Date of Patent: Oct. 25, 2022

(54) MACHINE LEARNING (ML) QUALITY ASSURANCE FOR DATA CURATION

(71) Applicant: Samasource Impact Sourcing, Inc., San Francisco, CA (US)

(72) Inventor: Loic Juillard, Novato, CA (US)

(73) Assignee: Samasource Impact Sourcing, Inc., San Francisco, CA (US)

( * ) Notice: Subject to any disclaimer, the term of this patent is extended or adjusted under 35 U.S.C. 154(b) by 0 days.

(21) Appl. No.: 17/151,123

(22) Filed: Jan. 16, 2021

(65) Prior Publication Data

US 2021/0390342 A1 Dec. 16, 2021

Related U.S. Application Data

(63) Continuation-in-part of application No. 17/145,292, filed on Jan. 9, 2021, now Pat. No. 11,270,438.

(60) Provisional application No. 63/038,358, filed on Jun. 12, 2020.

(51) Int. Cl.
*G06K 9/62* (2022.01)
*G06N 20/00* (2019.01)

(52) U.S. Cl.
CPC ......... *G06K 9/6256* (2013.01); *G06K 9/6262* (2013.01); *G06N 20/00* (2019.01)

(58) Field of Classification Search
CPC ..... G06K 9/6256; G06K 9/6262; G06N 20/00
See application file for complete search history.

(56) References Cited

U.S. PATENT DOCUMENTS

| 10,140,421 | B1* | 11/2018 | Bernard | G06F 40/30 |
| 2018/0204111 | A1* | 7/2018 | Zadeh | G06N 3/0454 |
| 2020/0161005 | A1* | 5/2020 | Lyman | G06K 9/6274 |

OTHER PUBLICATIONS

Krishnamurthy, Prabhakar, "Understanding Bias", https://towarddatascience.com/.

* cited by examiner

*Primary Examiner* — David T Welch
(74) *Attorney, Agent, or Firm* — Law Office of Gerald Maliszewski; Gerald Maliszewski (57) ABSTRACT

A system and method are provided for machine learning (ML) quality assurance. The method trains a plurality of agent ML annotation model software applications. Each agent annotation model is trained with a corresponding subset of annotated raw data images including annotation marks forming a boundary surrounding the first shape. A baseline ML annotation model is trained with all the subsets of annotated raw data images. The method accepts an evaluation dataset with unannotated images including the first shape, which is provided to the agent models and baseline models. In response to the evaluation dataset, the agent and baseline models infer predicted images including annotation marks forming a boundary surrounding the first shape. The baseline model predicted images are compared to the predicted images of each agent model for the purpose of determining agent model quality and identifying problematic raw data images for retraining purposes.

12 Claims, 4 Drawing Sheets

$$IoU = \frac{AREA\ OF\ OVERLAP}{AREA\ OF\ UNION}$$

MACHINE LEARNING (ML) QUALITY ASSURANCE FOR DATA CURATION

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to machine learning (ML) systems and, more particularly, to systems and methods for measuring ML annotation model quality.

2. Description of the Related Art

Previously, human annotators were often tasked with creating masks over specific areas of a given image, thus identifying the underlying pixels as belonging to a particular object instance (instance segmentation—pixel annotation to identify objects) or, more generally, a region of interest (semantic segmentation—pixel-by-pixel annotation). This was done by painting pixels pertaining to the region of interest with a chosen color, a rather lengthy process. Today, most annotation interfaces include a polygon tool that allows the annotator to trace the contour of a region of interest from which the mask is to be extracted, thus making the segmentation task significantly more efficient.

When developing an ML model, a training dataset is created containing images representative of the environment in which the model is operating. A training dataset is a set of images and associated annotations. An annotation is a form of marking the image where features of interest (e.g., objects or scenes) are highlighted in the picture. The training dataset is typically annotated by humans. There is a correlation between ML model annotation accuracy and training data annotation accuracy, so annotation precision is essential during the training stage. When finally trained on the training dataset, the ML model is ready to begin annotation of a selected feature.

Each customer project (annotation feature) is not static. A customer tends to send batches of data collected in different environments or with different sensors without particular instructions. For example, a customer may send a batch of data consisting of highway images taken during the day, with the next series of data being a set of night pictures taken in a city, or a set of data taken with a different lens, etc. Thus, customers do not always communicate changes with their data submissions, and therefore do not always understand that resulting impact on annotation quality or time. Further, customers may also change the annotation instructions during a project. For example, they may start with road scenes requesting annotations of cars, including the mirrors. Later on in the project, they may have realize that the mirrors create false positives, so they change their annotation instructions to no longer include the mirrors. This poses two issues: for one, the customer must generate an official project requirement change, which is not always as easy as it might seem. Second, each and every annotating agent on the project must be made aware of the change, which can be difficult if there are, for example, 600-1000 agents.

Because the customer data being receiving are unique, there is no ability to programmatically compare the annotated images produced by agent models with a "perfect" version of this annotation—so detecting, grading, and correcting, has to be done manually. In addition to the overhead of manual testing, while some issues are outright "misses", others are caused by misunderstandings of customer requirements. Agents whose tasks were rejected often do not understand the error made, and how they should have annotated the content.

Currently, the industry is using 3 techniques to guaranty data quality:

Multiple submissions: have different agents annotate the same content and submit the annotation back to the customer. The issue is cost, since the content is processed multiple times. Also, as the dataset size increase, economy of scale cannot be realized.

Quality control (QC): have experts sample the data (e.g., a 100% sample) and identify gaps/issues. With this methodology, the cost is also an issue since expert time is expensive. Also, experts may not fully understand the customer requirements and wrongly validate, or invalidate the annotations.

Gold tasks: A set of tasks that are carefully annotated (possibly by specialists) to build a ground truth dataset (called a gold set, or gold dataset). At a regular interval, these tasks a re-submitted to agents unannotated, and the result of their annotation is compared with the gold dataset. This method would seem to solve the issues brought up by the first two methodologies, but in practice, agents memorize the gold dataset rapidly. Thus, the gold dataset should be very large, which turns out to be more costly than any other method.

It would be advantageous if conventional quality measurements of ML agent annotation models could be replaced by comparing agent model metrics against the combined metrics of all the agent models.

SUMMARY OF THE INVENTION

Disclosed herein are a system and method for comparing the annotated images produced by agent machine learning (ML) models with a simple quality standard version of the same annotations. More explicitly, the individual agent models are compared to the results inferred from the combined results. In other words, individual results are leveraged from a "crowd wisdom" perspective. The approach measures agent model accuracy over time without the requirement of conventional quality control, and is independent of customer requirement changes. This approach permits agents to be retrained by identifying failed content, and submitting the failed content back to them for the purpose of retraining.

Accordingly, a method is provided for ML quality assurance. The method trains a plurality of agent ML annotation model software applications. Each agent annotation model is trained with a corresponding subset of annotated raw data images including annotation marks forming a boundary surrounding the first shape. A baseline ML annotation model is trained with all the subsets of annotated raw data images. The method accepts an evaluation dataset with unannotated images including the first shape for supply to the agent models and baseline model. In response to the evaluation dataset, the agent and baseline models infer predicted images including annotation marks forming a boundary surrounding the first shape. The baseline model predicted images are compared to the predicted images of each agent model for the purpose of determining agent model quality. In one aspect, the evaluation dataset images are selected to depict the first shape in a plurality of different background environments. In another aspect, the method supplies the evaluation dataset with gold dataset images having accuracy verified first shape annotation marks.

Prior to training the agent and baseline models, a plurality of human agent user interfaces (UIs) are provided, with each UI accepting a corresponding subset of raw data images with the first shape. Each UI supplies the subset of annotated raw data images for training to a corresponding agent model.

In one aspect, the step of comparing the baseline model predicted images to agent model predicted images includes supplying agent model predictions including classification, localization, and probability. Classification predictions determine a class of shape into which falls the shape identified by the annotation marks in the baseline model predicted images, and identified in the agent model predicted images. Localization predictions determine the image coordinates of the first shape identified by the annotation marks in the baseline model predicted images and in the agent model predicted images. Probability predictions determine the statistical probability of the localization and classification predictions being accurate.

Further, the step of comparing the baseline model predicted images to agent model predicted images includes making comparisons based on agent model quality metrics such as activation, label accuracy, precision, tracking, and points per shape. For each agent model, activation determines the number of first shapes identified, as compared to the number of first shapes identified by the baseline model. For each agent model, label accuracy makes a comparison between labels applied to identified first shapes, and the labels applied to first shapes identified by the baseline model. For each agent model, a precision analysis compares the annotation mark outlines identifying first shapes, and the baseline model annotation mark outlines. Tracking makes a comparison between motion vector annotation marks of video and three-dimensional first shapes from each agent model, and the baseline model motion vector annotation marks. For each agent model, a points per shape comparison is made between the number of points used to create polygon annotation marks, and the number of points used in the baseline model polygon annotation marks. The quality metrics are used to calculate a quality score for each agent model.

Finally, after tracking the quality metrics for each agent model annotation image, the method cross-references minimum quality agent model annotation images to corresponding raw data images, and identifies the raw data images for agent model retraining.

Addition details of the above-described method and an associated system for ML annotation model quality assurance are provided below.

DETAILED DESCRIPTION

Figure 1:
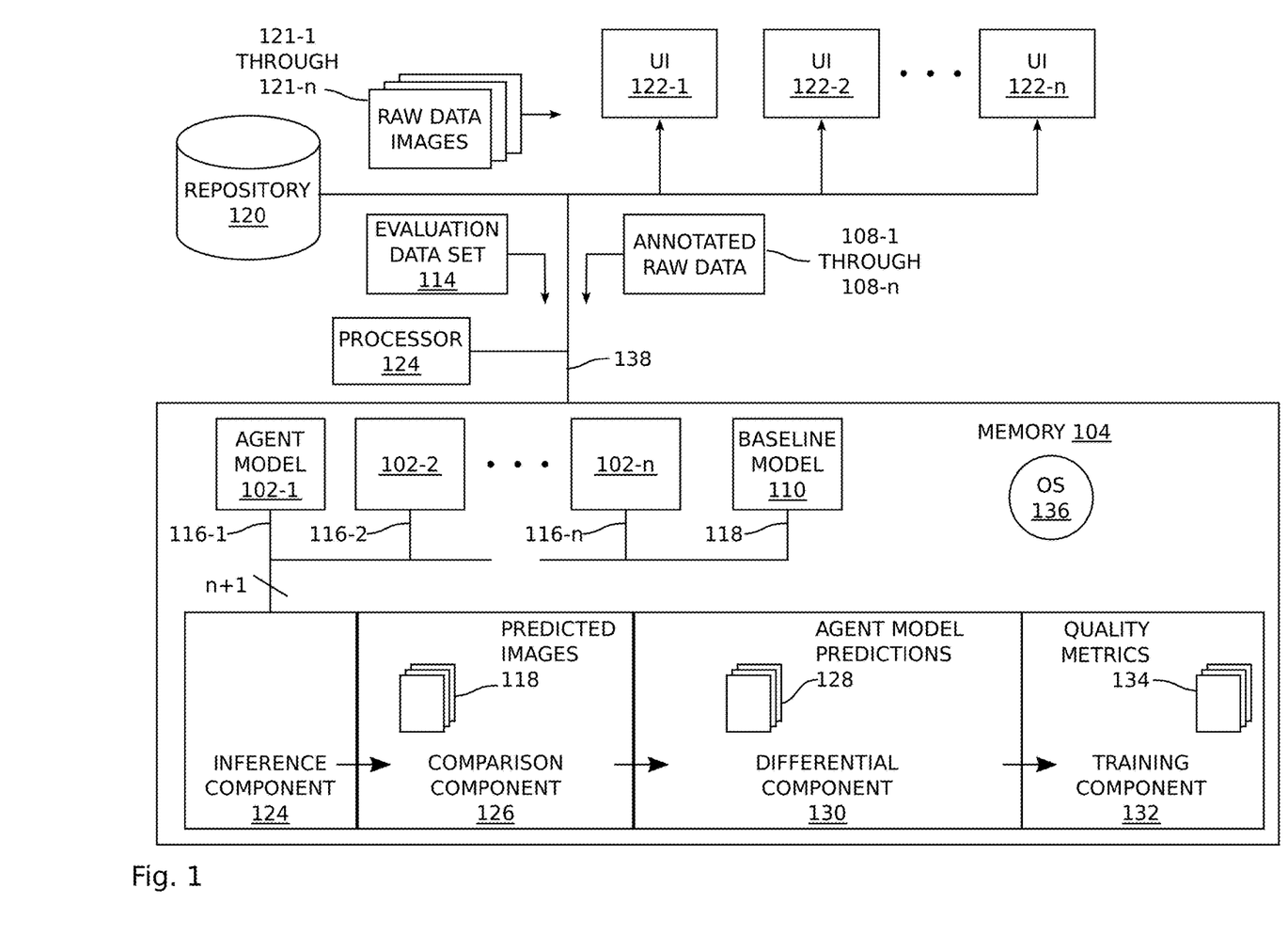
FIG. 1 is a schematic block diagram depicting a system for machine learning (ML) quality assurance.

FIG. 1 is a schematic block diagram depicting a system for machine learning (ML) quality assurance. The system 100 comprises a plurality of agent ML annotation model software applications 102-1 through 102-*n*. Each agent annotation model is stored in a non-transitory memory 104 and enabled as a sequence of processor 106 executable steps for inferring agent model annotated images as trained from a corresponding subset of annotated raw data images 108-1 through 108-*n* including a first shape. The purpose of the agent models 102-1 through 102-*n* is to infer agent model annotation images including annotation marks forming a boundary surrounding the first shape. Some examples of an annotation marks include a raster mask, bounding box, polygon, key point annotation, vector annotation, line, semantic segmentation (a type of raster), and instance semantic segmentation (another type of raster). For a bounding box, the coarse boundary may be a set of points encompassing an object. For polygons, the coarse boundary may be a list of coordinates (points of the polygon). For segmentation, the coarse boundary may be an image file containing pixel masks of the shape being annotated, similar in concept to a transparent page being superimposed on the raw data image shape. In one aspect, the annotation models may concatenate a heatmap from colors within the raw data annotations, match the heatmap to a selected segmentation model, and convert the selected segmentation model into annotation marks (e.g., a raster mask).

A baseline ML annotation model software application 110 is stored in the memory 104 and enabled as a sequence of processor 106 executable steps for inferring baseline model annotated images as trained from all the subsets of annotated raw data images 108-1 through 108-*n*. The inferred baseline model annotation images include annotation marks forming a boundary surrounding the first shape.

An evaluation software application 112 is stored in the memory 104 and enabled as a sequence of processor 106 executable steps for inferring the agent and baseline models using an evaluation dataset 114 with unannotated images including the first shape. The evaluation application 112 supplies predicted images 116-1 through 116-*n* from the agent models 102-1 through 102-*n*. The evaluation application 112 also supplies predicted images 118 from the baseline model 110. The predicted images 102-1 through 102-*n* and 118 include annotation marks forming a boundary surrounding the first shape. The evaluation application compares the baseline model predicted images 118 to the predicted images of each agent model 116-1 through 116-*n*. The evaluation dataset 114 is supplied from repository 120. In one aspect, the evaluation dataset 114 includes images selected to depict the first shape in a plurality of different background environments. In another aspect, the evaluation dataset 114 includes gold dataset images with accuracy verified first shape annotation marks.

Typically, the system 100 comprises a plurality of human agent user interfaces (UIs) 122-1 through 122-*n*. Each UI accepts a corresponding subset of raw data images 121-1 through 121-*n* with the first shape from repository 120. Typically, the raw data images are two-dimensional still images, but they may also be three-dimensional (3D) point cloud or 3D vector data, or video content. Each UI 122-1 through 122-*n* supplies subsets of annotated raw data images 108-1 through 108-*n*, for training, to corresponding agent models 102-1 through 102-*n*. The UIs typically comprise elements such as a display, keypad, mouse, touchpad, touch-screen, trackball, stylus, or cursor direction keys, and voice-activated software, to name a few examples.

The evaluation application 112 comprises an inference component 124 running the agent models 102-1 through 102-*n* and baseline model 110 to infer the agent predicted images 116-1 through 116-*n* and the baseline predicted images 118. A comparison component 126 compares the baseline model predicted images 118 and agent model predicted images 116-1 through 116-*n* to supply agent model predictions 128 including classification, localization, and probability. A differential component 130 accepts the agent model predictions 128 used to measure agent model quality characteristics 134.

The classification predictions determine a class of shapes into which falls the shape identified by the annotation marks in the baseline model predicted images, and in the agent model predicted images. Localization predictions determine the image coordinates of the first shape identified by the annotation marks in the baseline model predicted images, and in the agent model predicted images. Probability predictions determine the statistical probability of the localization and classification predictions being accurate.

The differential component 130 compares baseline model predicted images 118 to agent model predicted images 116-1 through 116-*n* based on agent model quality metrics 134 such as activation, label accuracy, precision, tracking, and points per shape. For each agent model, activation is a comparison between the number of first shapes identified, and the number of first shapes identified by the baseline model. For example, the issues resolved are: has the object in question been annotated at all, or was it missed in the scene? Label accuracy is a comparison between labels applied to identified first shapes for each agent model, and the labels applied to first shapes by the baseline model. That is, the issue resolved is: was the right label selected (e.g. did the agent mistakenly labeled a car as a pedestrian)?

Precision is a comparison between the annotation mark outlines identifying first shapes from the agent models and the baseline model annotation mark outlines. The issues resolved are: how close to the actual outline of the shape are the annotation marks? For example, are the edges of the bounding box tangent to the outline of the shape? Was any protruding part of the shape missed? Tracking, for each agent model, is a comparison of motion vector annotation marks for video or three-dimensional first shapes, and the baseline model motion vector annotation marks. The issue resolved is: was the shape oriented properly? For example, if a car is annotated with a bounding box in a video, is the direction vector indeed pointing in the direction of motion for the car? Points per shape, for each agent model, is a comparison between the number of points used to create polygon annotation marks, to the number of points used in the baseline model polygon annotation marks. The issue resolved is: has the agent optimized the number of points in a polygon shape to get the right outline with a minimum number of points? For example, while annotating a car, has the agent optimized the number of points going over the car roof? The differential component 130 uses the quality metrics 134 to calculate a quality score (see 220, FIG. 2) for each agent model 102-1 through 102-*n*.

In one aspect, the evaluation application 112 comprises a training component 132 tracking the quality metrics 134 for each agent model annotation image. The training component cross-references minimum quality agent model annotation images to corresponding raw data images, to identify the raw data images for agent model retraining. In other words, the training component 132 is able to supply raw data images most beneficial for retraining purposes. In addition, the training component 132 is able to suggest which agent models suffer from the poorest quality and, therefore, which human agent are most in need of retraining.

System 100 broadly represents any type single or multi-processor computing device or system capable of executing computer-readable instructions. Examples of computing system 100 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 100 may be programmed, configured, and/or otherwise designed to comply with one or more networking protocols. According to certain embodiments, computing system 100 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 100 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Bluetooth protocol, an IEEE 802.XX protocol, a frame relay protocol, a token ring protocol, a spanning tree protocol, and/or any other suitable protocol.

Processor 106 generally represents any type or form of processing unit capable of processing data, or interpreting and executing instructions. Processor 106 may represent an application-specific integrated circuit (ASIC), a system on a chip (e.g., a network processor), a hardware accelerator, a general purpose processor, and/or any other suitable processing element. As is common with most computer system, processing is supported through the use of an operating system (OS) 136 stored in memory 104.

System memory 104 generally represents any type or form of non-volatile (non-transitory) storage device or medium capable of storing data and/or other computer-readable instructions. Examples of system memory 104 may include, without limitation, Random Access Memory (RAM), Read Only Memory (ROM), flash memory, or any other suitable memory device. Although not required, in certain embodiments computing system 104 may include both a volatile memory unit and a non-volatile storage device. System memory 104 may be implemented as shared memory and/or distributed memory in a network device. Furthermore, system memory 104 may store packets and/or other information used in networking operations.

In certain embodiments, exemplary computing system 100 may also include one or more components or elements in addition to processor 106 and system memory 104. For example, computing system 100 may include a memory controller, an Input/Output (I/O) controller, and a communication interface (not shown), as would be understood by one with ordinary skill in the art. Further, examples of communication infrastructure include, without limitation, a communication bus 138 (such as a Serial ATA (SATA), an Industry Standard Architecture (ISA), a Peripheral Component Interconnect (PCI), a PCI Express (PCIe), and/or any other suitable bus), and a network. Note, that for simplicity the communication between devices in system 100 is shown as using bus line 138, although in practice the devices may be connected on different lines using different communication protocols.

Agent Model Training

ML models are trained to mimic the behavior of humans. It is the foundation of artificial intelligence (AI). The process of training a ML model involves having human annotate data according to a standard defined by the customer. Teams of agents generally "even out" any cognitive or perception disparities between individual agents. An annotation made by any single agent often leads to a model bias conditioned by the agent's perception and abilities.

The system described above eliminates the need for discreet quality checks (e.g. validating one instance sampled out of many) and instead characterizes any overall deficiencies using machine learning. Using this technique, the best of conventional quality assurance (QA) methodologies is obtained, without the cost and lack of repeatability.

At a high level, each agent model is trained on customer data (raw data images), as performed by corresponding human agent. The agent models are compared to a baseline to identify the gaps and drifts per the quality metrics defined above. The comparison can also be used to determine agent mentors/leaders for each area of the metrics listed above, for the purpose of retraining more poorly performing agents.

Figure 2:
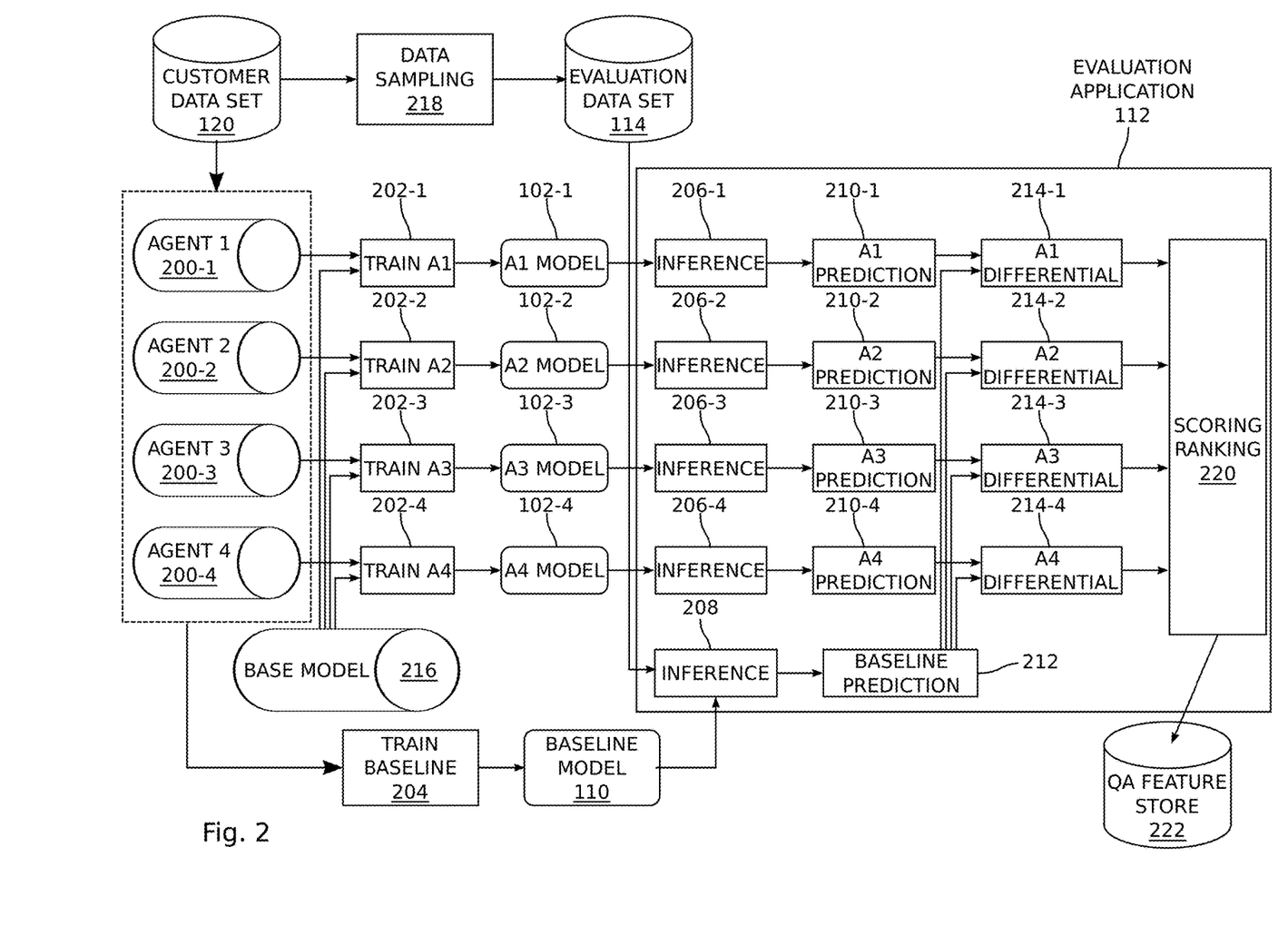
FIG. 2 is a diagram depicting the system of FIG. 1 as viewed from a functional perspective.

FIG. 2 is a diagram depicting the system of FIG. 1 as viewed from a functional perspective. Agents 200-1 through 200-4 are each provided with a dataset of raw data images, which is a subset of the overall dataset provided by the customer in repository 120. Training occurs using the subsets of raw data images as signified by reference designators 202-1 through 202-4 to build the corresponding agent models 102-1 through 102-4. Training 204 also occurs using all the subsets of raw data images by agents 200-1 through 200-4 to build the baseline model 110. Using an evaluation dataset 114, inferences 206-1 through 206-4 are made for the agent models 102-1 through 102-4, and inference 206 is also made for the baseline model 110.

The output of the inference process is predicted annotated images 210-1 through 210-4 made by the trained agent models and the predicted annotated images 212 made by the baseline model 110. Differentials 214-1 through 214-4 are a calculation of agent model quality metrics made by comparing the agent model predicted images 210-1 through 210-4 to the baseline model predicted images 212.

Model Training

Each agent 200-1 through 200-4 begins training using a common initial base model 216. Then, the agent models 102-1 through 102-4 are trained based upon the subsets of raw data images actually annotated, which varies for each agent. For example, Agent 200-1 annotates 154 images from a total of 550 images in repository 120 sent by the customer. A new model 102-1 is trained beginning with the standard base model 216 using the 154 annotated images. Agent 200-2 annotates 94 images of the 550 images sent by the customer, and model 102-2 is trained. Agent 200-3 annotates 115 images of the 550 images sent by the customer, and model 102-3 is trained. Agent 200-4 annotates 54 images of the 550 images sent by the customer, and model 102-4 is trained. 133 raw data images remain unannotated and are not used as training data. Next, the baseline model 110 uses all the agent's annotated content (417 images annotated by Agents 200-1 through 200-4) for training.

Customer Dataset Sampling: Evaluation Dataset

The evaluation dataset 114 is used to "grade" the agents according to a pre-defined rubric. The evaluation dataset can take different forms. In the case of a customer having a large volume of data, the evaluation dataset is sampled 218 from the original dataset in repository 120. In one aspect, a conventional off-the-shelf software application may be used that compares two images and returns a value indicating how visually similar they are. The dataset is iteratively processed and a "distance" calculation is made to identify a set of images with maximum contrast. Distance may be understood to be a difference in the raw data image backgrounds or scene detection. Scene detection is an ML technique that helps identify the environment in which the raw data image was taken, such as city, country, night, day, tunnel, etc. An open source model such as Yolo or EfficientNet can perform this function. A maximum distance calculation is an attempt to obtain images spread across the widest number of environments.

For example, image 1 is taken during the day, on a highway with 10 cars. Image 2 is a picture taken on the same highway and same location, but at night, with 2 cars. Running a scene detection, a positive score is obtained for the highway (1), and a negative for time of day (0). Image 3 is substantially the same as image 1, just taken a fraction of a second later. Scene detection scores a 1 for both images 1 and 3. Then, an application such as OpenCV can be used to determine if the same exact image is used. OpenCV determines an image likeliness index (a number between 0 and 1), and the evaluation dataset images can be chosen with the least amount of likeliness.

If the customer dataset is small, for example, less than 100 shapes annotated per shape type, the evaluation dataset may be an entirely new dataset provided by the customer. The customer dataset may also contain images that are manually inserted by the customer or service provider that are always part of the evaluation dataset. Data from a gold dataset can be added to the evaluation dataset. Because the gold dataset is ground truth, no baseline inference need be run. Instead, agent models are scored using the gold dataset.

Thus, the final evaluation dataset typically contains a set of visually diverse images (as diverse as possible). Optionally, a set of images earmarked by the customer or service provide may be included, and/or a gold dataset included (if one exists).

Differential Process

As described above, differential analyses 214-1 through 214-4 are performed on the predicted images from each agent model and compared to the baseline model to determine the quality characteristics of each specific agent. Making predictions is the role of the inference service 206-1 through 206-4. The inference service runs the evaluation dataset through the agent and baseline models to produce the predictions. The predictions are:

Classification determines which relevant objects (called classes) in the images were processed;

Localization determines the existence of relevant annotation for the class identified. For example, the creation of bounding boxes if a customer requested bounding boxes, or polygons if the customer requested polygons, etc.

Probability determines the statistical probability of the prediction (e.g., a number between 0 and 1). The probability represents how "comfortable" the inference is with the output produced.

It should be noted that the above-described techniques may be used in conjunction with the more conventional quality control strategies such as gold datasets, QC, and multiple submission.

Activation

Activation is defined as the presence or absence of an annotated shape for a relevant object (called class) on the media being annotated (e.g., video, image, 3D). In other words, has the agent missed any object they were supposed to annotate? Have the agents annotated a class that shouldn't have been annotated? This metric is calculated by counting the number of shapes predicted in the baseline model and comparing this number to the number of shapes predicted by the agent model predictions. Because two errors may cancel themselves (i.e., an agent might have annotated more shaped than they should have, and also missed others), the shape count is associated with a general positioning where the predicted shape from the baseline model should be within a pre-determined percentage of the agent model shape prediction (similar in concept to a Venn diagram).

The scoring is as follows:
If the shape produced by the agent model is annotated and in the general location of the baseline model, the agent receives 1 point;
If the agent model shape does not fall within the general location, or the shape wasn't created at all, the agent (agent model) receives 0 points.

The final score is calculated as the average of points divided by the count of classes from the baseline model prediction.

In the case of video and 3D point clouds, scoring is performed frame-by-frame. Depending on customer requirements, the agent model, for each shape, may receive a weighted (prorated) score for missed frames (where an object is annotated in the video, but missed in certain frames), or receives a 0 for any frame missed. Some customer may consider the annotation faulty if the shape is missed in any frame, even if the object is only very partially visible.

Label Accuracy

As in the activation rubric, label accuracy is calculated by comparing the shape from the agent model predicted images with the baseline model predicted images. For each shape with a close match to the baseline model predicted image shape, the label is compared to the baseline model label. An accurate label receives 1 point and a wrong label receives 0 points. Unlike activation, the scope for this category is the average number of correct label, as compared to the total number of labels for the media annotated.

Precision

Figure 3:
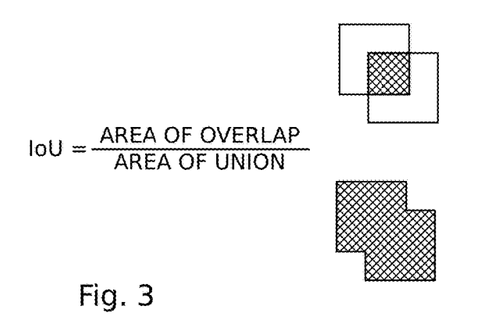
FIG. 3 is a diagram depicting intersection over union (IoU) as applied to precision.

FIG. 3 is a diagram depicting intersection over union (IoU) as applied to precision. The scoring for precision is calculated using the conventional ML technique of IoU. For each shape predicted by the agent model, the IoU with the baseline model prediction is calculated. If a shape is missing in the agent model, the agent receives 0 for that shape. If a shape is present in the agent annotation, but missing in the model prediction, the agent also receives 0. The score in this category is the average IoU for all shapes on the media annotated.

Tracking

The tracking rubric only applies to 3D and video. In some cases, the annotators are asked to indicate the direction in which a shape is going. This is done using a vector or dominant face on a cuboid facing the direction of travel. Grading for this metric is done by measuring the angle from the baseline model vector:

If the angle is between 0 and the customer quality threshold (per customer annotation instructions), 1 point is attributed;
Else 0 point is attributed.

The final scoring for this rubric is the sum of points allocated, divided by the number of objects (classes) annotated.

Points Per Shape

Points per shape scoring only applies to polygon annotation. A shape annotated accurately (within the customer requirements) with a fewer number of points is more efficient. Therefore, grading is also based on the number of points created. For the shapes with precision that fall within the customer requirements, the point count from the agent model is compared with the baseline model. The agent is rated with the following formula (for each shape):

The number of points from the agents model/the number of points from the baseline model;
If the resulting number is less than 0, the agent model receives 0 points. If the resulting number is greater than 0, the agent model receives the result from the formula. The final score is the sum of the points allocated for the media annotated.

Training, Remediation

Using the above-described metrics, it can be determined which agents are producing better quality annotated images than other agents. Therefore, it would be advantageous to use the quality metrics to efficiently remediate identified quality issues. A simple approach would be to take the highest scoring agent in each category and train the less performing agents. The issue with this methodology is that the cost and time to retrain would be prohibitive. Also, some of the metrics above are linked, and sometimes the root cause may come from a broader set of issues that the metric isn't able to capture. Instead, the idea of mentorship is retained, but the best mentors are associated with explicit quality metrics, with the objective of minimizing the number of training sessions needed to bring the poorer performing agents up to speed.

A mentor agent's overall performance is measured as follows:
the rate at which media is processed;
annotated image content representative of the problem being solved; and,
with the attributes above, media delivered with a high degree of quality.

Agent Training Grouping

Figure 4:
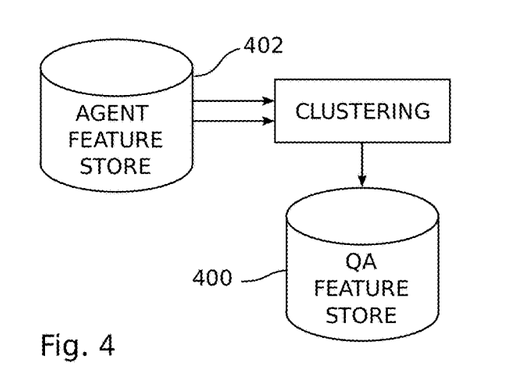
FIG. 4 is a diagram depicting agent quality clustering.

FIG. 4 is a diagram depicting agent quality clustering. The rubrics in order of importance are:
1. Activation;
2. Label accuracy;
3. Precision;
4. Tracking; and,
5. Points per shape.

In other words, without proper activation, label accuracy or precision may not be relevant, etc. The order of priority is important for scoring. For example, a low score on item 2 (label accuracy) makes the score for item 3 (precision) less important.

Agent clusters are grouped as follows:
1. Poor activation score;
2. Poor label accuracy and precision;
3. Poor tracking; and,
4. Low points per shape efficiency.

Using the features from the QA feature store 400 and the agent feature store 402, agents can be grouped into 3 categories:

Low yield/Low score;
High yield/low score; and,
High yield/high score.

Using the high yield/high score category, the highest performing agents are identified to champion the training/mentoring sessions.

Asset of Interest

Once the mentors are identified, the content causing the most issues for the agent group being trained is identified, to create adequate training material. For each agent in the cluster, the media (images, video or 3D) associated with the lowest score by classes (objects categories) is identified. Some projects can have a very large image or class content (e.g., the number of classes to be annotated can be over 1000 for some customers) and going over all problematic content may not be possible. Each problematic image may be identified, isolated from the less problematic images, and bundled for training/retraining.

Figure 5:
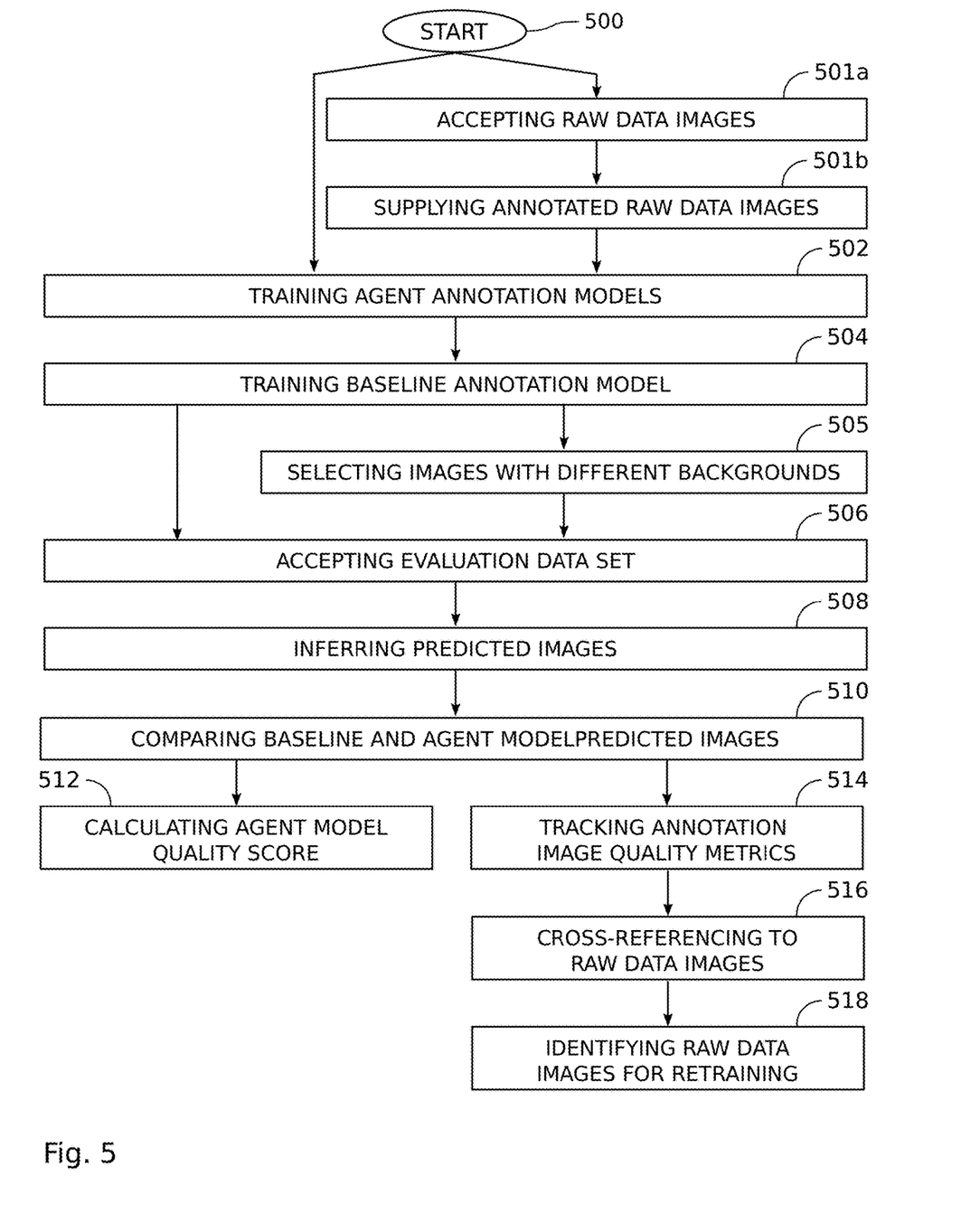
FIG. 5 is a flowchart illustrating a method for ML quality assurance.

FIG. 5 is a flowchart illustrating a method for ML quality assurance. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 500.

Step 502 trains a plurality of agent ML annotation model software applications. Each agent annotation model is stored in a non-transitory memory, enabled as a sequence of processor executable steps, and trained with a corresponding subset of annotated raw data images including annotation marks forming a boundary surrounding the first shape. Step 504 trains a baseline ML annotation model software application (stored in a non-transitory memory and enabled as a sequence of processor executable steps) with all the subsets of annotated raw data images. Step 506 accepts an evaluation dataset with unannotated images including the first shape for provision to the agent models and baseline models. In one aspect, Step 506 supplies gold dataset images with accuracy verified first shape annotation marks. In another aspect, Step 505 selects evaluation dataset images to depict the first shape in a plurality of different background environments (distance).

In response to the evaluation dataset, the agent and baseline models in Step 508 infer predicted images including annotation marks forming a boundary surrounding the first shape. Step 510 compares the baseline model predicted images to the predicted images of each agent model. In one aspect, prior to training the agent models in Step 502 and baseline models in Step 504, Step 501*a* provides a plurality of human agent IIIs, with each UI accepting a corresponding subset of raw data images with the first shape. In Step 501*b* each UI supplies the subset of annotated raw data images for training to a corresponding agent model.

In another aspect, comparing the baseline model predicted images to agent model predicted images in Step 510 includes supplying agent model predictions including classification, localization, and probability. More explicitly, supplying agent model predictions includes:

making classification predictions determining a class of shapes into which falls the shape identified by the annotation marks in the baseline model predicted images, and in the agent model predicted images;

making localization predictions determining the image coordinates of the first shape identified by the annotation marks in the baseline model predicted images, and in the agent model predicted images; and, making probability predictions determining the statistical probability of the localization and classification predictions being accurate.

In yet another aspect, comparing the baseline model predicted images to agent model predicted images in Step 510 includes making comparisons based on agent model quality metrics such as activation, label accuracy, precision, tracking, and points per shape. More explicitly, comparing agent model quality metrics includes:

for each agent model making an activation comparison between the number of first shapes identified and the number of first shapes identified by the baseline model;

for each agent model, making a label accuracy comparison between labels applied to identified first shapes and the labels applied to identified first shapes by the baseline model;

for each agent model, making a precision comparison between the annotation mark outlines identifying first shapes, and in the baseline model annotation mark outlines;

for each agent model, making a tracking comparison of motion vector annotation marks for video or three-dimensional first shapes, and the baseline model motion vector annotation marks; and, for each agent model, making a points per shape comparison between a number of points used to create polygon annotation marks and the number of points used in the baseline model polygon annotation marks.

In one aspect, the method further comprises Step 512, of using the quality metrics to calculate a quality score for each agent model. Alternatively, or in addition, Step 514 tracks the quality metrics for each agent model annotation image. Step 516 cross-references minimum quality agent model annotation images to corresponding raw data images, and Step 518 identifies the raw data images for agent model retraining.

Figure 6:
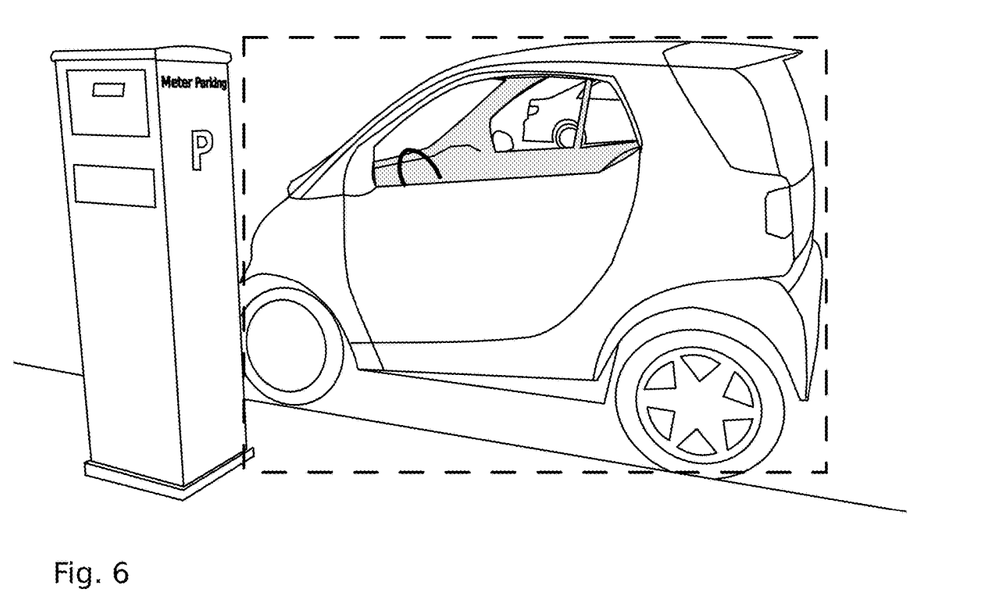
FIG. 6 is a depiction of an image with a car in the foreground identified with annotation marks, but with a car in the background mistakenly left unannotated (activation metric).

FIG. 6 is a depiction of an image with a car in the foreground identified with annotation marks, but with a car in the background mistakenly left unannotated (activation metric).

A system and method have been provided for ML annotation quality assurance. Examples of particular message structures, method steps, and hardware units have been presented to illustrate the invention. However, the invention is not limited to merely these examples. Other variations and embodiments of the invention will occur to those skilled in the art.

I claim:

1. A system for machine learning (ML) quality assurance, the system comprising:
a plurality of agent ML annotation model software applications, each agent annotation model stored in a non-transitory memory and enabled as a sequence of processor executable steps for inferring agent model annotated images as trained from a corresponding subset of annotated raw data images including a first shape, with the agent model annotation images including annotation marks forming a boundary surrounding the first shape;

a baseline ML annotation model software application stored in the memory and enabled as a sequence of processor executable steps for inferring baseline model annotated images as trained from all the subsets of annotated raw data images, with the baseline model annotation images including annotation marks forming a boundary surrounding the first shape;

an evaluation software application stored in the memory and enabled as a sequence of processor executable steps for inferring the agent and baseline models using an evaluation dataset with unannotated images including the first shape, supplying predicted images including annotation marks forming a boundary surrounding the first shape from the agent models and baseline models, and comparing the baseline model predicted images to the predicted images of each agent model;

wherein the evaluation application comprises:
an inference component running the agent and baseline models to infer the baseline model predicted images and agent model predicted images;
a comparison component comparing the baseline model predicted images and agent model predicted images to supply agent model predictions selected from the group consisting of classification, localization, probability, and combinations thereof;
a differential component to accept the agent model predictions and to measure agent model quality characteristics;

wherein the comparison component supplies agent model predictions as follows:
classification predictions determining a class of shape into which falls a shape identified by the annotation marks in the baseline model predicted images, and identified in the agent model predicted images;
localization predictions determining the image coordinates of the first shape identified by the annotation marks in the baseline model predicted images, and identified in the agent model predicted images;
probability predictions determining the statistical probability of the localization and classification predictions being accurate, wherein the differential component compares baseline model predicted images to agent model predicted images based on agent model quality metrics selected from the group consisting of activation, label accuracy, precision, tracking, points per shape, and combinations thereof, and supplies agent model quality metrics as follows:
activation—for each agent model, a comparison between a number of first shapes identified, and a number of first shapes identified by the baseline model;
label accuracy—for each agent model, a comparison between labels applied to identified first shapes, and the labels applied to identified first shapes by the baseline model;
precision—for each agent model, a comparison between the annotation mark outlines identifying first shapes, and the baseline model annotation mark outlines;
tracking—for each agent model, a comparison between motion vector annotation marks for video or three-dimensional first shapes, and the baseline model motion vector annotation marks; and,
points per shape—for each agent model, a comparison between a number of points used to create polygon annotation marks, and a number of points used in the baseline model polygon annotation marks.

2. The system of claim 1 further comprising:
a plurality of human agent user interfaces (UIs), each UI accepting a corresponding subset of raw data images with the first shape and supplying the subset of annotated raw data images for training to a corresponding agent model.

3. The system of claim 1 wherein the differential component uses the quality metrics to calculate a quality score for each agent model.

4. The system of claim 1 wherein the evaluation application comprises a training component tracking the quality metrics for each agent model annotation image, cross-referencing minimum quality agent model annotation images to corresponding raw data images, and identifying the raw data images for agent model retraining.

5. The system of claim 1 wherein the evaluation dataset includes images selected to depict the first shape in a plurality of different background environments.

6. The system of claim 1 wherein the evaluation dataset includes gold dataset images with accuracy verified first shape annotation marks.

7. A method for machine learning (ML) quality assurance, the method comprising:
training a plurality of agent ML annotation model software applications, each agent annotation model stored in a non-transitory memory, enabled as a sequence of processor executable steps, and trained with a corresponding subset of annotated raw data images including annotation marks forming a boundary surrounding the first shape;
training a baseline ML annotation model software application stored in a non-transitory memory, enabled as a sequence of processor executable steps, and trained with all the subsets of annotated raw data images;
accepting an evaluation dataset with unannotated images including the first shape for provision to the agent models and baseline models;
in response to the evaluation dataset, the agent and baseline models inferring predicted images including annotation marks forming a boundary surrounding the first shape; and,
comparing the baseline model predicted images to the agent model predicted images by supplying agent model predictions selected from the group consisting of classification, localization, probability, and combinations thereof, where the agent model predictions include:
making classification predictions determining a class of shapes into which falls a shape identified by the annotation marks in the baseline model predicted images, and identified in the agent model predicted images;
making localization predictions determining the image coordinates of the first shape identified by the annotation marks in the baseline model predicted images, and identified in the agent model predicted images;
making probability predictions determining the statistical probability of the localization and classification predictions being accurate;
wherein comparing the baseline model predicted images to agent model predicted images also includes making comparisons based on agent model quality metrics selected from the group consisting of activation, label accuracy, precision, tracking, points per shape, and combinations thereof, as follows:

for each agent model, making an activation comparison between a number of first shapes identified, and in a number of first shapes identified by the baseline model;

for each agent model, making a label accuracy comparison between labels applied to identified first shapes, and labels applied to identified first shapes by the baseline model;

for each agent model, making a precision comparison between the annotation mark outlines identifying first shapes, and the baseline model annotation mark outlines;

for each agent model, making a tracking comparison between motion vector annotation marks for video or three-dimensional first shapes, and the baseline model motion vector annotation marks; and, for each agent model, making a points per shape comparison between a number of points used to create polygon annotation marks, and a number of points used in the baseline model polygon annotation marks.

8. The method of claim 7 further comprising:

prior to training the agent and baseline models, providing a plurality of human agent user interfaces (UIs), each UI accepting a corresponding subset of raw data images with the first shape; and, each UI supplying the subset of annotated raw data images for training to a corresponding agent model.

9. The method of claim 7 further comprising:

using the quality metrics to calculate a quality score for each agent model.

10. The method of claim 7 further comprising:

tracking the quality metrics for each agent model annotation image;

cross-referencing minimum quality agent model annotation images to corresponding raw data images; and, identifying the raw data images for agent model retraining.

11. The method of claim 7 further comprising:

selecting evaluation dataset images to depict the first shape in a plurality of different background environments.

12. The method of claim 7 wherein accepting the evaluation dataset includes accepting gold dataset images with accuracy verified first shape annotation marks.

* * * * *